United States Patent
Agarwal et al.

(10) Patent No.: US 10,552,419 B2
(45) Date of Patent: Feb. 4, 2020

(54) METHOD AND SYSTEM FOR PERFORMING AN OPERATION USING MAP REDUCE

(71) Applicant: InMobi Pte. Ltd., Singapore (SG)

(72) Inventors: Gaurav Agarwal, Bhagwatiganj (IN); Srikanth Sundarrajan, Dhandeeswarm Nagar (IN)

( * ) Notice: Subject to any disclaimer, the term of this patent is extended or adjusted under 35 U.S.C. 154(b) by 742 days.

(21) Appl. No.: 14/553,826

(22) Filed: Nov. 25, 2014

(65) Prior Publication Data

US 2015/0149498 A1    May 28, 2015

(51) Int. Cl.
  *G06F 16/24* (2019.01)
  *G06F 16/2455* (2019.01)

(52) U.S. Cl.
  CPC .............. *G06F 16/24556* (2019.01)

(58) Field of Classification Search
  CPC ......... G06F 17/30445; G06F 17/30471; G06F 8/314; G06F 17/30545; G06F 17/30498; G06F 17/30463; G06F 17/30584; G06F 17/30292; G06F 17/30516; G06F 17/30569; G06F 17/30587; G06F 17/30109; G06F 9/5066; G06F 2209/5017; G06F 8/427; G06F 17/30; G06F 7/00; G06F 17/30321; G06F 17/3038; G06F 17/30598; G06F 17/30076; G06F 17/30115; G06F 17/30336; G06F 17/30454; G06F 17/30457; G06F 17/30539; G06F 16/24556
  USPC ......... 707/714, 737, E17.017, E17.044, 713, 707/719, 736, E17.01, E17.089, 687, 825, 707/999.102, 741, 793, 999.003; 706/12
  See application file for complete search history.

(56) References Cited

U.S. PATENT DOCUMENTS 8,612,368 B2 * 12/2013 Burdick ............... G06F 9/4843 706/12
9,170,848 B1 * 10/2015 Goldman ............ G06F 16/2365
9,619,291 B2 *  4/2017 Pueyo .................. G06F 9/5066
(Continued)

FOREIGN PATENT DOCUMENTS

WO    2013009503 A2    1/2013

OTHER PUBLICATIONS

Pigul, A., Comparative Study Parallel Join Algorithms for Map Reduce Environment, Proceedings of the Institute for System Programming of the Russian Academy of Sciences, 2012, pp. 285-305, vol. 23, ISSN 2079-8156. (Per MPEP 609.04(a), Applicant points out that the year of publication is sufficiently earlier than the effective U.S. filing date and any foreign priority date so that the particular month of publication is not in issue.).

(Continued)

*Primary Examiner* — Alford W Kindred
*Assistant Examiner* — Cecile H Vo

(57) ABSTRACT

The present invention provides a computer implemented method for performing an application specific operation on a dataset over a distributed computing system. The computer implemented method includes collecting a set of application specific refining data present in a data stream of the dataset in a first map phase by the distributed computing system, resetting the data stream of the dataset to a beginning position by the distributed computing system, and generating one or more resultant data elements using the set of application specific refining data in a second map phase, by the distributed computing system.

20 Claims, 4 Drawing Sheets

(56) References Cited

U.S. PATENT DOCUMENTS

2008/0086442 A1\* 4/2008 Dasdan .................. G06F 16/278
2012/0226639 A1\* 9/2012 Burdick .................. G06F 8/427
　　　　　　　　　　　　　　　　　　　　　706/12

OTHER PUBLICATIONS

Bajda-Pawlikowski, Kamil et al., Efficient Processing of Data Warehousing Queries in a Split Execution Environment, SIGMOD'11, Jun. 12-16, 2011, pp. 1-12, Athens, Greece.

\* cited by examiner

METHOD AND SYSTEM FOR PERFORMING AN OPERATION USING MAP REDUCE

FIELD OF INVENTION

The present invention relates to map reduce framework and in particular, it relates to performing operations using the map reduce framework.

BACKGROUND

Advent of Web 2.0 has revolutionized Internet and Internet based applications. It has provided users with freedom to interact and collaborate over the Internet in ways not possible earlier. This has resulted in an explosive increase in user content generated by blogs, social media sites and various other Web 2.0 technologies. Contributing to this information explosion is the already accumulating business intelligence data that is generated everyday across various companies and industries. Such huge volumes of data have necessitated the creation of paradigms which are storage-aware in order to load and retrieve data efficiently. One such paradigm is map reduce model.

Map Reduce model refers to a programming paradigm to perform parallel computations over distributed (typically, very large) data sets (See Jeffrey Dean and Sanjay Ghemawat, "Map Reduce: Simplified Data Processing on Large Clusters", OSDI 2004). The map reduce framework includes one or more mappers and one or more reducers. Each mapper performs a map job for dividing the input and generating intermediate result, and each reducer performs a reduce job for aggregating all the intermediate results to generate a final output. Map reduce model uses data parallelization to perform distributed computations on massive amounts of data using a clusters of servers.

Map reduce model is used to perform SQL like operations on huge volumes of data. In a typical analytics application, map reduce model is used to perform join operation to stitch factual data table (typically very large) to metadata table (typically much smaller than factual data table in size) and then perform further operations like projections, filtering and aggregations, etc. Unfortunately, the join operation is fairly expensive, as each join step involving a different join criterion requires its own complete map reduce phase.

There have been several approaches to optimize the join operation. One approach is called Map-Side join. In Map-Side join, the smaller table is loaded in memory of the servers performing the map job. During the map phase, a single tuple from the larger data is taken and the corresponding value of a join key is queried against the smaller table in memory. On finding a corresponding tuple in the smaller table, a join operation is performed between the two tuples. However, this approach fails to work when the size of smaller table is too large to be loaded in memory. This approach fails especially when dealing with metadata tables which are likely to grow steadily. Therefore, this approach is often practically infeasible.

Another such approach is called Semi Join. Semi Join refers to a type of Map-Side join where only those rows of large table, which will be actually required during the join operation, are transmitted during the map phase. Current implementation of Semi Join uses three map-reduce jobs to perform the join operation (See Patel et al., *A Comparison of Join Algorithms for Log Processing in MapReduce*, SIGMOD, 2010). The first map reduce job is used to identify all the distinct join keys present in the larger table and generate a look-up table using these keys. The second map reduce job identifies rows in the smaller table which have join keys corresponding to the values in the look-up table. The third map reduce job loads the identified rows in memory and performs Map-Side join with the larger table. However, using three map reduce jobs involves shuffling a large volume of data across the network and therefore is time consuming. Moreover, using three map reduce jobs is expensive in terms of memory consumed and processor time used. In addition, when the number of identified rows is large, it would be infeasible to load all the identified rows in memory.

Another such approach is called Per Split Semi Join. Per Split Semi Join refers to a type of Semi Join, where the Semi Join operation is performed for a segment of the larger table and not the entire table. Often large tables are stored by splitting them and storing across various servers. The resulting segment is called a split. However, this approach uses three map reduce jobs and therefore, suffers from the disadvantages mentioned above. Moreover, due to the existence of multiple splits, a tuple of the smaller table having a join key in both the splits will be repeated. This results in redundancies and often causes an explosion in the size of the resulting look up tables.

In light of the above discussion, there is a need for a method and system which overcomes all the above stated problems.

BRIEF DESCRIPTION OF THE INVENTION

The above-mentioned shortcomings, disadvantages and problems are addressed herein which will be understood by reading and understanding the following specification.

In embodiments, the present invention provides a computer implemented method for performing an application specific operation on a dataset over a distributed computing system. The computer implemented method includes collecting a set of application specific refining data present in a data stream of the dataset in a first map phase by the distributed computing system, resetting the data stream of the dataset to a beginning position by the distributed computing system, and generating one or more resultant data elements using the set of application specific refining data in a second map phase by the distributed computing system.

In an embodiment, the computer implemented method further includes reducing the one or more resultant data elements to form a resultant dataset in a reduce phase, by the distributed computing system.

In an embodiment, the computer implemented method further includes generating one or more intermediate data elements based on the set of application specific refining data in a third map phase by the distributed computing system prior to the generating the one or more resultant data elements. The one or more intermediate data elements are used for generating the one or more resultant data elements.

In an embodiment, the application specific operation is a join operation over the dataset and another dataset. The application specific refining data includes one or more distinct join keys.

In an embodiment, the computer implemented method further includes generating a look up table based on the one or more distinct join keys by the distributed computing system. The look-up table includes a set of data elements corresponding to the one or more distinct join keys, from the another dataset.

In an embodiment, each resultant data element of the one or more resultant data elements is generated by joining a data element of the another dataset with a corresponding data element of the dataset using the look-up table.

In another aspect, the present invention provides a system for performing an application specific operation on a dataset. The dataset includes one or more splits. The system includes a computer cluster. The computer cluster includes a set of interconnected computer nodes. Each computer node of the set of interconnected computers nodes has one or more processors and memory.

The one or more splits are distributed on the set of interconnected computer nodes in the computer cluster. The set of interconnected computer nodes includes one or more mappers, and one or more reset modules. Each mapper from the one or more mappers is configured to collect a set of application specific refining data present in a data stream of a split of a the one or more splits in a first map phase, and generate one or more resultant data elements using the set of application specific refining data in a second map phase. Each reset module from the one or more reset modules is configured to reset a data stream of a split of the one or more splits to a beginning position.

In an embodiment, the set of interconnected computer nodes further includes one or more reducers for aggregating the one or more resultant data elements in a reduce phase to form a resultant dataset, and for applying at least one application-specific reduce operation to the resultant dataset. In an embodiment, the set of interconnected computer nodes further includes one or more look up table generators. Each look up table generator is configured to generate a look up table using the set of application specific refining data.

Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
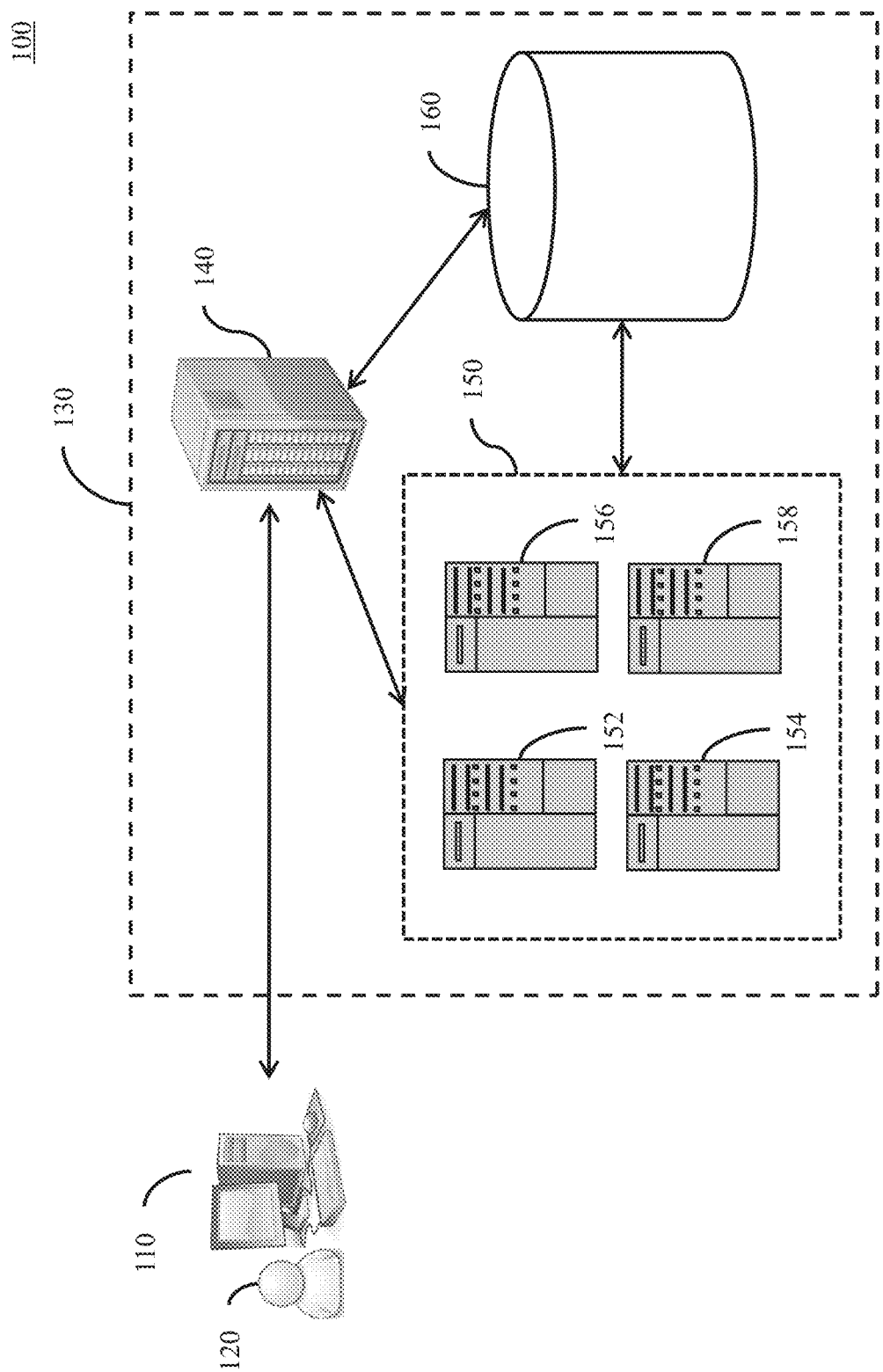
FIG. 1 illustrates a distributed computing system for performing an application specific operation on a dataset, in accordance with various embodiments of the present invention.

FIG. 1 illustrates a distributed computing system 100 for performing an application specific operation on a dataset, in accordance with various embodiments of the present invention.

The distributed computing system 100 includes a user terminal 110. In context of the present invention, the user terminal 110 refers to a workstation or a dumb terminal used by a user 120. In an embodiment, the user terminal 110 allows the user 120 to assign tasks to a computer cluster 130. In another embodiment, a program running on the user terminal 110 automatically assigns tasks to the computer cluster 130.

In an embodiment, the user terminal 110 allows the user 120 to determine the kind of operation to be performed. For example, the user terminal 110 allows the user 120 to select a join operation. In another embodiment, the user terminal 110 allows the user 120 to enter a data analysis query. The execution of the data analysis query includes the execution of a semi join operation.

In context of the present invention, the dataset refers to a collection of large-scale data. For example, the dataset is a table containing the name, electronic mail address and date of birth of all users on a social networking site. In another example, the dataset is a table containing a log of recent activities of all users on the social networking site. In an embodiment, the dataset is stored in key value pair format. Key value pair format refers to data representation format where the data is stored in the form: <key, value>.

In an embodiment, the distributed computing system 100 is based on master-slave architecture. The computer cluster 130 includes a master node 140. The master node 140 receives the assigned task and allots to the assigned task to a set of worker computer nodes 150. In an embodiment, as shown in FIG. 1, the set of worker computer nodes 150 includes a worker computer node 152, a worker computer node 154, a worker computer node 156 and a worker computer node 158. In an embodiment, the dataset is broken down into splits of megabytes. In context of the present invention, a split refers to a contiguous segment of data. The splits are located on the set of worker nodes 150. The master node 140 maintains metadata about the splits. The master node 140 uses the metadata to assign the task in an optimal fashion. For example, when a task relates to data available on split 1 and not split 2, the master node 140 will assign the task to worker computer node having split 1 and not to any other worker computer node. By doing so, the master node 140 exploits the locality of data to cut down network chatter and thereby improves computational efficiency.

The master node 140 is responsible for managing the progress of the task. A worker computer node constantly sends a "heartbeat" message to the master node 140 along with the status of the task the worker computer node was assigned. The "heartbeat" message informs the master node 140 about the health of the worker computer node. If the master node 140 does not get any information from the worker node for a threshold time, the master node 140 re-schedules the task on another worker computer node. The output generated by the worker nodes is stored in a datastore 160.

A map reduce framework is embedded on the set of worker computer nodes 150. The map reduce framework assists the computer cluster 130 in distributed computing. The map reduce framework is based on map reduce paradigm.

Map reduce paradigm is a programming methodology to perform parallel computations over distributed (typically, very large) data sets. Map reduce paradigm is a popular model for data-intensive parallel computation in shared-nothing clusters. Example applications for the map reduce paradigm include processing crawled documents, Web request logs, etc.

Map reduce paradigm consists of two primary operations: a map operation and a reduce operation. A map function maps input key value pairs to intermediate key value pairs. A reduce function represents all mapped (intermediate) key value pairs sharing the same key to a single key value pair or a list of values.

The map reduce framework includes one or more mappers. The one or more mappers are present on the set of worker computer nodes 150. Each worker computer node from the set of worker computer nodes 150 has a plurality of slots. Each slot represents a vacant process slot or task slot on which a process, such as a mapper, is run. The number of mappers on the worker computer node depends on a configuration policy and the number of slots available on the worker computer node.

In an example, on receiving a task from the master node 140, a worker computer node starts a mapper for the split available with the worker computer node. The mapper iterates over all input pairs present in a data stream of the split, applying the map function. The mapper generates an intermediate output pair after applying the map function. At the end of the mapper execution, the worker computer node merges all intermediate outputs pairs into a single sorted stream.

Additionally, the map reduce framework includes one or more reset modules. The reset modules are present on the set of worker computer nodes 150. Continuing the previous example, on completion of the execution of the mapper, a reset module present on the worker computer node, resets the data stream of the split to a beginning position.

In an embodiment, the map reduce framework includes one or more reducers. The one or more reducers are present on the set of worker computer nodes 150. A reducer from the one or more reducers fetches all the intermediate output pairs that share a certain key and applies the reduce function on the intermediate output pairs. In an embodiment, the output of each reducer of the one or more reducers is stored in the datastore 160. In context of the present invention, the one or more reducers are configured to aggregate the one or more resultant data elements generated by the one or more mappers.

Figure 2:
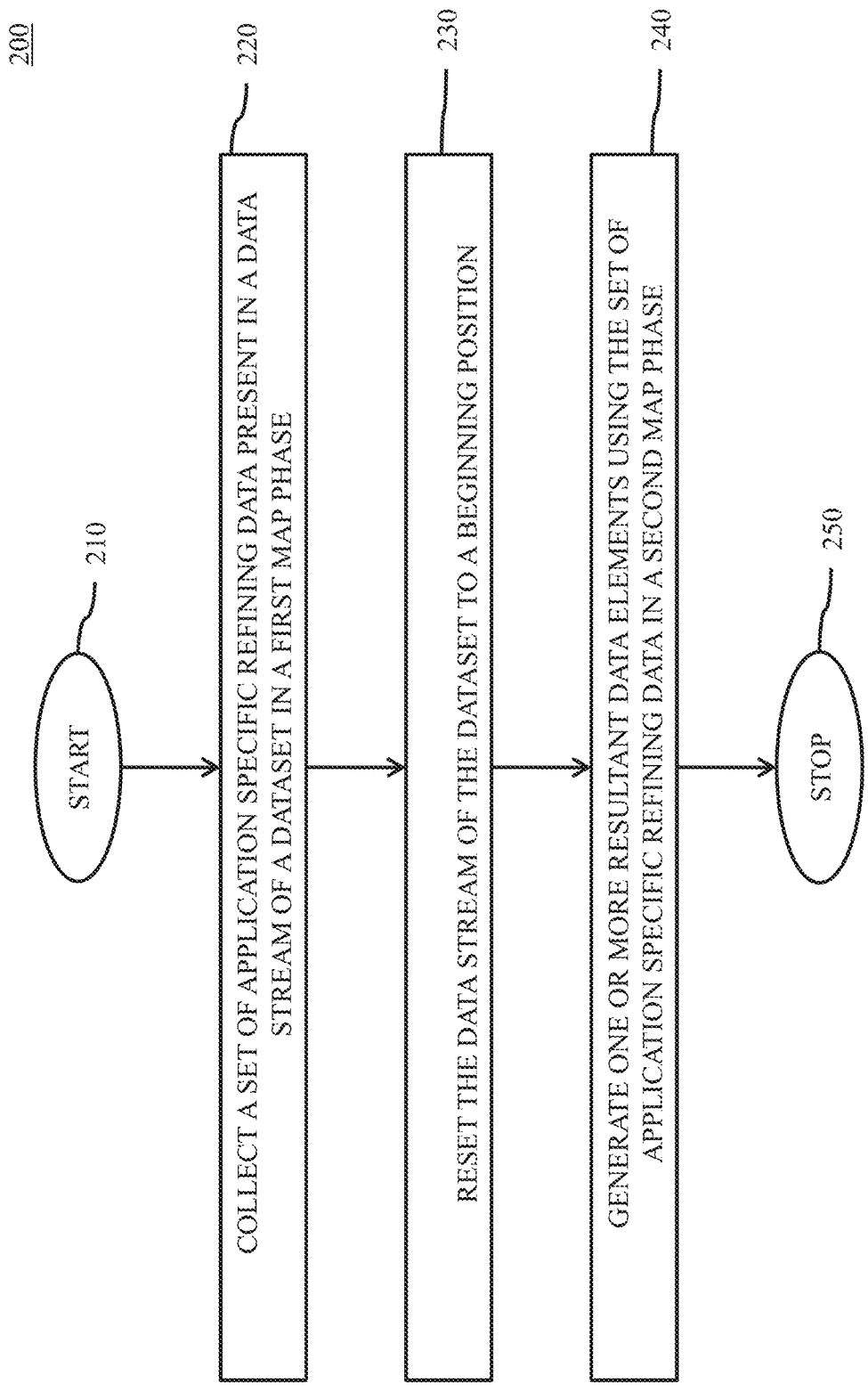
FIG. 2 illustrates a flowchart for performing the application specific operation on the dataset, in accordance with various embodiments of the present invention.

FIG. 2 illustrates a flowchart 200 for performing the application specific operation on the dataset. For the sake of explanation, the flowchart 200 is explained using an exemplary worker computer node 152. However, the steps of the flowchart 200 are executed by all the worker computer nodes (152-158) of the set of worker computer nodes 150.

At step 210, the flowchart 200 initiates. At step 220, the worker computer node 152 initiates the mappers present on the worker computer node 152. The mappers operate on split present on the worker computer node 152. The mappers collect a set of application specific refining data from a data stream of the split in a first map phase.

The mappers read through one or more data elements of the split to identify the set of application specific refining data. The split is available to the mappers in the data stream. On completion of the first map phase, the mappers provide the set of application specific refining data as output. Since the mappers have read the entire split, the data stream of the split is at an end position. The end position indicates that there is no more data element left in the split which has to be read.

Similarly, rest of worker computer nodes (154-158) initiate the mappers present on the rest of the worker computer nodes (154-158) to collect the sets of application specific refining data from data streams of splits present on the worker computer nodes (154-158).

At step 230, the worker computer node 150 executes a reset module from present on the worker computer node 150, to reset the data stream of the split to a beginning position. By resetting the data stream of the split to the beginning position, the one or more mappers can read from the data stream of the split. The one or more reset modules allows the map reduce framework to reuse the mappers to perform operations on the dataset. The one or more reset module allows the map reduce framework to implement multiphase or multi-pass mappers.

Similarly, the rest of worker computer nodes (154-158) execute the reset modules present on the rest of the worker computer nodes (154-158) to reset the data streams of splits present on the worker computer nodes (154-158).

At step 240, the worker computer node 152 restarts the mappers to generate one or more resultant data elements in the second map phase. The mappers perform an application specific operation using the set of application specific refining data to generate the one or more resultant data elements. Similarly, the rest of worker computer nodes (154-158) restart the mappers to generate one or more resultant data elements in the second map phase.

In an embodiment, the one or more resultant data elements are reduced using the one or more reducers present on the set of worker computer nodes 150 to form a resultant dataset in a reduce phase.

In an embodiment, one or more intermediate data elements are generated based on the set of application specific refining data in a third map phase by the mappers prior to the generating the one or more resultant data elements. The one or more intermediate data elements are used for generating the one or more resultant data elements.

By reusing the mappers, the present invention reduces the number of map-reduce jobs required. In addition, the present invention reduces network traffic and network load. Since the mappers reuse data elements of the dataset, there is no shuffling of data across network. Additionally, this reduces the time taken to perform operations. At step 250, the flowchart 200 terminates.

Figure 3:
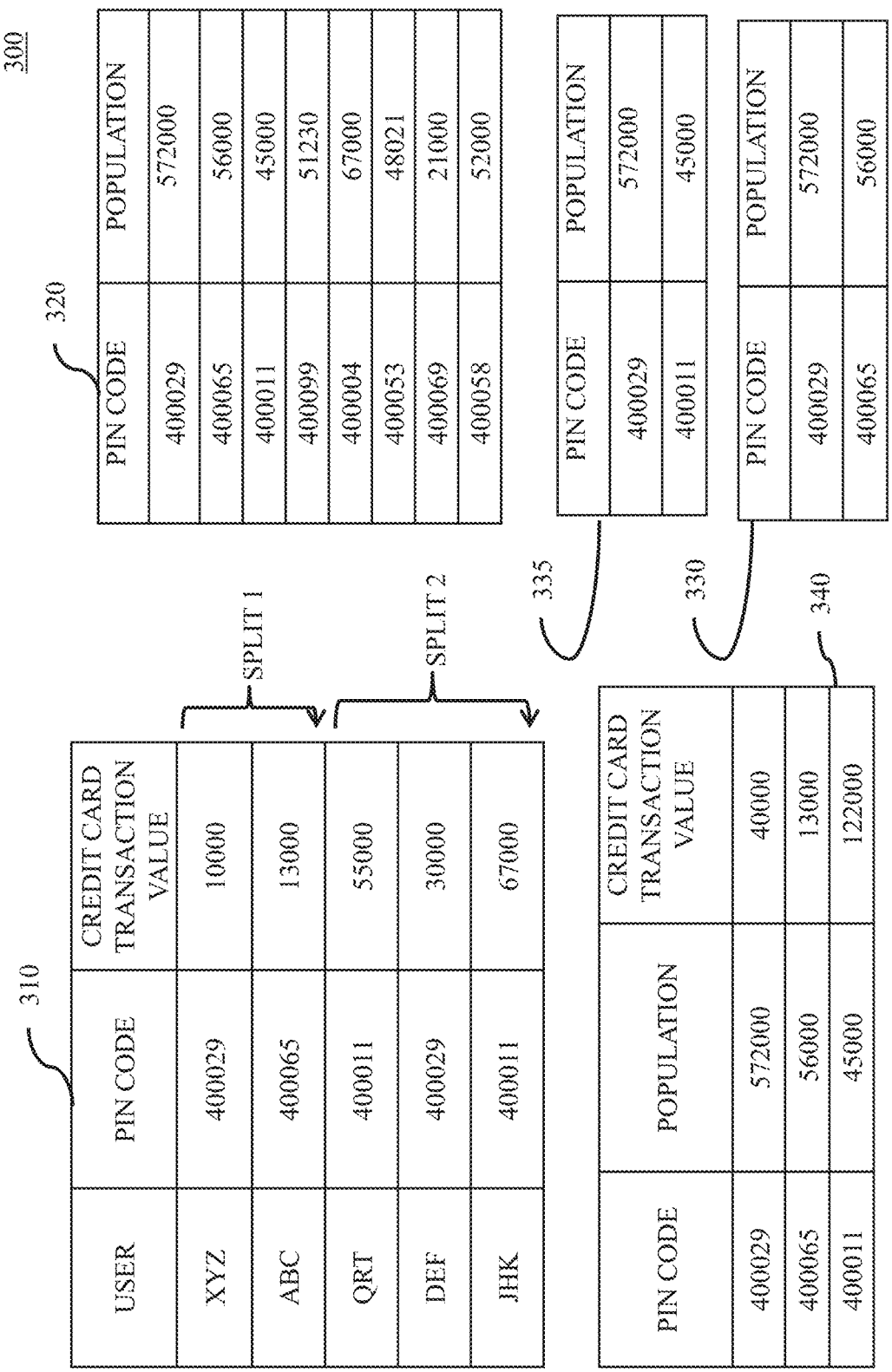
FIG. 3 illustrates an exemplary join operation performed over the dataset and another dataset, in accordance with various embodiments of the present invention.

FIG. 3 illustrates an exemplary join operation performed over the dataset 310 and another dataset 320. The dataset 310 is a table contains three attributes: name of a user, pin code of the user and value of credit card transactions performed by the user. The another dataset 320 is a table contains two attributes: pin code and population per pin code. A query for displaying credit card transactions according to population forms the basis of the join operation. The common attribute i.e. the pin code is used as the join attribute. Resultant table 340 is the result of the query. The resultant table 340 has three attributes: pin code, population per pin code and credit card transaction value per pin code. For the execution of the query, the distributed computing system 100 performs a semi join between the dataset 310 and the another dataset 320.

In the example, the map reduce framework executes a map side join to perform the semi join. The dataset is segmented and stored as two splits. Split 1 includes the first two rows and split 2 includes the last 3 rows. In the example, the worker computer node 152 and worker computer node 154 store the split 1 and split 2 respectively. Therefore, the master node 140 assigns the task to the worker computer nodes 152 and worker computer node 154.

The worker computer nodes 152 and 154 initiate the mappers present on the worker computer nodes 152 and 154. During the first map phase, the one or more mappers parse through the dataset 310 to collect the set of application specific refining data. In the example, application specific refining data refers to one or more distinct join keys. Join keys refers to the values of the join attribute in the dataset 310.

The mappers present on the worker computer node 152 identify values: 400029 and 400065 as the one or more distinct join keys. The mappers present on the worker computer node 154 identify values: 400029 and 400011 as the one or more distinct join keys.

On completion of the first map phase, the reset module present on the worker computer node 152 resets the data stream of the split 1 to the beginning position. Similarly, the reset module present on the worker computer node 154 resets the data stream of the split 2 to the beginning position.

In an embodiment, the set of worker computer nodes 150 include one or more look up table generators. The look up table generators generate look up tables using the set of application specific refining data.

In the present example, the worker computer node 152 starts a look up table generator present on the worker computer node 152. The look up table generator creates a look up table 330 using the one or more distinct join keys found by the mappers on worker computer node 152. The look up table 330 includes tuples of the another dataset 320 which have the distinct one or more join keys.

Similarly, the worker computer node 154 starts a look up table generator present on the worker computer node 154. The look up table generator creates a look up table 335 using the one or more distinct join keys found by the mappers on worker computer node 154. The look up table 335 includes tuples of the another dataset 320 which have the distinct one or more join keys.

In the second map phase, the one or more mappers present on the worker computer node 152 generate one or more resultant data elements using the set of application specific refining data. In the present example, the one or more mappers present on the worker computer node 152 join the tuples of the dataset 310 with the tuples of the look up table 330 to generate one or more resultant tuples. According to FIG. 3, the one or more mappers will join tuples:

```
<XYZ,400029,10000> with <400029,572000>,
<DEF,400029,30000> with <400029,572000>,and
<ABC,400065,13000> with <400065,56000>,
.
```

Similarly, the one or more mappers present on the worker computer node 154 join the tuples of the dataset 310 with the tuples of the look up table 335 to generate one or more resultant tuples. According to FIG. 3, the one or more mappers will join tuples:

```
<XYZ,400029,10000> with <400029,572000>,
<DEF,400029,30000> with <400029,572000>,
<QRT,400011,55000> with <400011,45000>, and
<JHK,400011,67000> with <400011,45000>.
```

In the example, the one or more reducers are present on worker computer node 152. The one or more reducers will reduce the one or more resultant tuples to produce the resultant table 340. The one or more reducers will select all the resultant tuples that have the same join key and aggregate the tuples by removing user names and by adding all the credit card transaction values together. For example, the one or more reducers will select the resultant tuples <XYZ, 400029,10000,572000> and <DEF,400029,30000,572000>, and reduce them to get <400029,572000,40000>. On completion of the reduce phase, final output is written onto the datastore 160.

Figure 4:
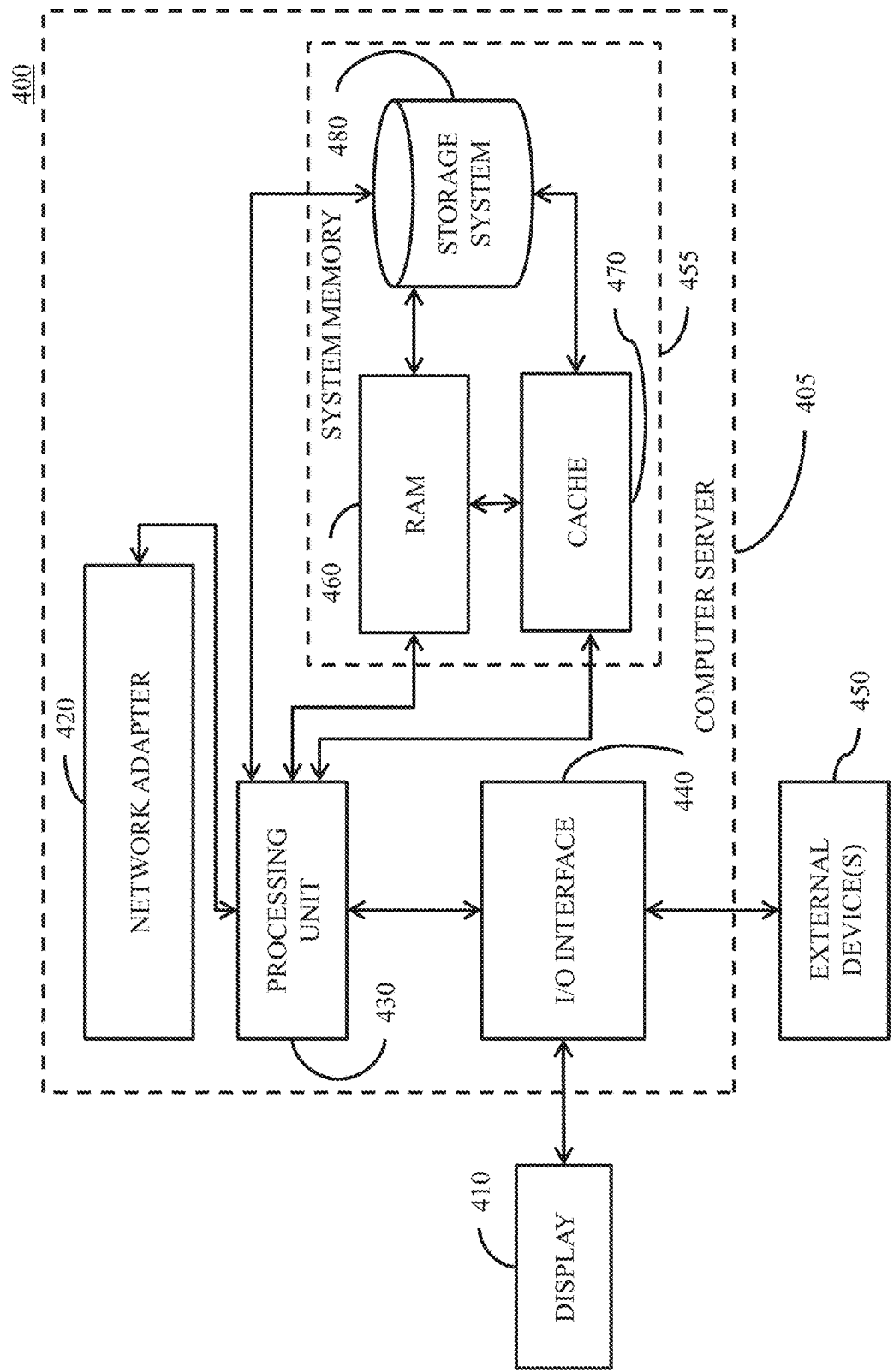
FIG. 4 illustrates a block diagram of a worker computer node, in accordance with various embodiments of the present invention.

FIG. 4 illustrates a block diagram of a worker computer node 400. The worker computer node 400 is only one example of a worker computer node and is not intended to suggest any limitation as to the scope of use or functionality of embodiments described herein. Regardless, the computer node 400 is capable of implementing and/or performing any of the functionality set forth herein.

The worker computer node 400 includes a computer server 405 which is operational with numerous other general purpose or special purpose computing system environments or configurations. Examples of well-known computing systems, environments, and/or configurations that may be suitable for use with computer server 405 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and the like.

In FIG. 4, the computer server 405 in the worker computer node 400 is shown in the form of a general-purpose computing device. The components of computer server 405 include, but are not limited to, processing unit 430, a system memory 455, a network adapter 420, a input-output (I/O) interface 440 and one or more buses that couples various system components to processing unit 430.

The one or more buses represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer server 405 typically includes a variety of computer system readable media. Such media may be any available media that is accessible by computer server 405, and includes both volatile and non-volatile media, removable and non-removable media. In an embodiment, the system memory 455 includes computer system readable media in the form of volatile memory, such as random access memory (RAM) 460 and cache memory 470. Computer server 405 may further include other removable/non-removable, non-volatile computer system storage media. In an embodiment, the system memory 455 includes a storage system 480.

Computer server 405 can communicate with one or more external devices 450 and a display 410, via input-output (I/O) interfaces 440. In addition, computer server 405 can communicate with one or more networks such as a local area network (LAN), a general wide area network (WAN), and/or a public network (for example, the Internet) via the network adapter 420.

It can be understood by one skilled in the art that although not shown, other hardware and/or software components can be used in conjunction with the computer server 405. Examples, include, but are not limited to: microcode, device drivers, redundant processing units, external disk drive arrays, RAID systems, tape drives, and data archival storage systems, etc.

In an embodiment, configuration and capabilities of the master node 140, the worker computer node 152, the worker computer node 154 and the worker computer node 156, and the worker computer node 158 are same as configuration and capabilities of the worker computer node 400.

As will be appreciated by one skilled in the art, aspects can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language and conventional procedural programming languages.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer implemented method for performing an application specific operation using map reducers to perform parallel computations to aggregate values of key value pairs in multiple distributed datasets having splits across multiple computer systems of a distributed computing system, the computer implemented method comprising:
   performing with one or more processors of the multiple computer systems included in the distributed computing system by executing instructions:
      collecting a set of application specific refining data present in a data stream of multiple splits of the dataset in a first map phase, wherein the multiple splits of the dataset reside on respective ones of the multiple computer systems in the distributed computing system;
      on each of the computer systems where at least one split of the dataset resides, executing one or more map functions of one or more mappers for the splits of the dataset, executing the map function of the mapper comprises:
         iterating over input key value pairs present in the splits of the data stream;
         applying the map function to the key value input pairs;
         identifying distinct keys across the datasets and the splits;
         joining the datasets based on the distinct keys;
         generating intermediate output key value pairs after applying the map function and join; and
         merging the intermediate output key value pairs into a single sorted stream;
      resetting the data stream of the one or more splits of the dataset to a beginning position by the distributed computing system to prepare for reuse of executing the one or more map reducers;
      executing one or more map reducers to aggregate the values in the key value pairs split across the multiple computer systems, wherein executing the one or more map reducers comprises:
         fetching the intermediate output key value pairs that share a key;
         applying a reduce function on the intermediate output key value pairs that share the key to aggregate the values of the intermediate output key value pairs generated by the one or more map functions; and
         generating one or more resultant data elements using the set of application specific refining data in a second map phase that consolidates keys in the key value pairs that share the key and pairing the shared key with the aggregate of the values paired with the shared key; and
      writing the one or more resultant data elements to a datastore.

2. The computer implemented method as claimed in claim 1, further comprising reducing, by the distributed computing system, the one or more resultant data elements to form a resultant dataset in a reduce phase.

3. The computer implemented method as claimed in claim 1, further comprising generating one or more intermediate data elements based on the set of application specific refining data in a third map phase by the distributed computing system prior to the generating the one or more resultant data elements, wherein the one or more intermediate data elements are used for generating the one or more resultant data elements.

4. The computer implemented method as claimed in claim 1, wherein:
   the application specific operation is a join operation over the dataset and another dataset; and
   the application specific refining data comprises one or more distinct join keys.

5. The computer implemented method as claimed in claim 4, further comprising generating a look up table based on the one or more distinct join keys by the distributed computing system, wherein the look-up table comprises a set of data elements corresponding to the one or more distinct join keys, from the another dataset.

6. The computer implemented method as claimed in claim 5, wherein each resultant data element of the one or more resultant data elements is generated by joining a data element of another dataset with a corresponding data element of the dataset using the look-up table.

7. A system for performing an application specific operation using one or more map reducers to perform parallel computations to aggregate values of key value pairs in multiple distributed datasets having splits across multiple, interconnected computer nodes of a distributed computing system, wherein the dataset comprises one or more splits, the system comprising:
a computer cluster comprising:
the set of interconnected computer nodes, each computer node of the set of interconnected computers nodes having one or more processors and memory;
wherein multiple splits are distributed on the set of interconnected computer nodes in the computer cluster and wherein the set of interconnected computer nodes comprises:
one or more mappers, wherein each mapper from the one or more mappers is configured to:
collect a set of application specific refining data present in a data stream of multiple splits of the dataset in a first map phase, wherein the multiple splits of the dataset reside on multiple computer systems in the distributed computing system; and
on each of the interconnected computer nodes where at least one split of the dataset resides, execute one or more map functions for the splits of the dataset, wherein to execute the one or more map functions of the mapper comprises:
iterate over input key value pairs present in the splits of the data stream;
apply the map function to the key value input pairs;
identify distinct keys across the datasets and the splits;
join the datasets based on the distinct keys;
generate intermediate output key value pairs after applying the map function and join; and
merge the intermediate output key value pairs into a single sorted stream;
one or more reset modules configured to reset the data stream of the one or more splits of the dataset to a beginning position by the distributed computing system to prepare for reuse of executing one or more map reducers;
the one or more map reducers to aggregate the values in the key value pairs split across the multiple computer nodes, wherein the one or map reducers are configured to:
fetch the intermediate output key value pairs that share a key; and
apply a reduce function on the intermediate output key value pairs that share the key to aggregate the values of the intermediate output key value pairs generated by the one or more map functions; and
generate one or more resultant data elements using the set of application specific refining data in a second map phase that consolidates keys in the key value pairs that share the key and pairing the shared key with the aggregate of the values paired with the shared key; and
a writing module to write the one or more resultant data elements to a datastore.

8. The system as claimed in claim 7, wherein the set of interconnected computer nodes further comprises:
one or more map reducers for aggregating the one or more resultant data elements in a reduce phase to form a resultant dataset, and for applying at least one application-specific reduce operation to the resultant dataset.

9. The system as claimed in claim 7, wherein the set of interconnected computer nodes further comprises:
one or more look up table generators, wherein each look up table generator is configured to generate a look up table using the set of application specific refining data.

10. The system as claimed in claim 7, wherein the one or more resultant data elements form a resultant dataset in a reduce phase.

11. The system as claimed in claim 7, wherein the set of interconnected computer nodes is further configured to:
generate one or more intermediate data elements based on the set of application specific refining data in a third map phase by the distributed computing system prior to the generating the one or more resultant data elements, wherein the one or more intermediate data elements are used for generating the one or more resultant data elements.

12. The system as claimed in claim 7, wherein
the application specific operation is a join operation over the dataset and another dataset; and
the application specific refining data comprises one or more distinct join keys.

13. The system as claimed in claim 7, wherein the set of interconnected computer nodes is further configured to:
generate a look up table based on the one or more distinct join keys by the distributed computing system, wherein the look-up table comprises a set of data elements corresponding to the one or more distinct join keys, from the another dataset.

14. The system as claimed in claim 13, wherein each resultant data element of the one or more resultant data elements is generated by joining a data element of another dataset with a corresponding data element of the dataset using the look-up table.

15. A non-transitory, computer readable program product comprising code stored therein for performing an application specific operation using map reducers to perform parallel computations to aggregate values of key value pairs in multiple distributed datasets having splits across multiple computer systems of a distributed computing system, wherein the code is executable by one or more processors of multiple computer systems included in the distributed computing system to:
collect a set of application specific refining data present in a data stream of multiple splits of the dataset in a first map phase, wherein the multiple splits of the dataset reside on multiple computer systems in the distributed computing system;
on each of the computer systems where at least one split of the dataset resides, execute one or more map functions of one or more mappers for the splits of the dataset, to execute the map function of the mapper comprises:
iterate over input key value pairs present in the splits of the data stream;
apply the map function to the key value input pairs;
identify distinct keys across the datasets and the splits;

join the datasets based on the distinct keys;
generate intermediate output key value pairs after applying the map function and join; and
merge the intermediate output key value pairs into a single sorted stream;
resetting the data stream of the one or more splits of the dataset to a beginning position by the distributed computing system to prepare for reuse of executing the one or more map reducers;
execute one or more map reducers to aggregate the values in the key value pairs split across the multiple computer systems, wherein executing the one or more map reducers comprises:
fetching the intermediate output key value pairs that share a key;
applying a reduce function on the intermediate output key value pairs that share the key to aggregate the values of the intermediate output key value pairs generated by the one or more map functions; and
generating one or more resultant data elements using the set of application specific refining data in a second map phase, by the distributed computing system; and
writing the one or more resultant data elements to a datastore.

16. The computer readable program product as claimed in claim 15, wherein the code is executable by one or more processors of one or more computer systems included in the distributed computing system to:
reduce, by the distributed computing system, the one or more resultant data elements to form a resultant dataset in a reduce phase.

17. The computer readable program product as claimed in claim 15, wherein the code is executable by one or more processors of one or more computer systems included in the distributed computing system to:
generate one or more intermediate data elements based on the set of application specific refining data in a third map phase by the distributed computing system prior to the generating the one or more resultant data elements, wherein the one or more intermediate data elements are used for generating the one or more resultant data elements.

18. The computer readable program product as claimed in claim 15, wherein:
the application specific operation is a join operation over the dataset and another dataset; and
the application specific refining data comprises one or more distinct join keys.

19. The computer readable program product as claimed in claim 15, wherein the code is executable by one or more processors of one or more computer systems included in the distributed computing system to:
generate a look up table based on the one or more distinct join keys by the distributed computing system, wherein the look-up table comprises a set of data elements corresponding to the one or more distinct join keys, from the another dataset.

20. The computer readable program product as claimed in claim 19, wherein each resultant data element of the one or more resultant data elements is generated by joining a data element of another dataset with a corresponding data element of the dataset using the look-up table.

\* \* \* \* \*